June 3, 1930.      E. J. VON PEIN      1,761,548
CASH REGISTER
Filed April 23, 1920      6 Sheets-Sheet 3
FIG.3
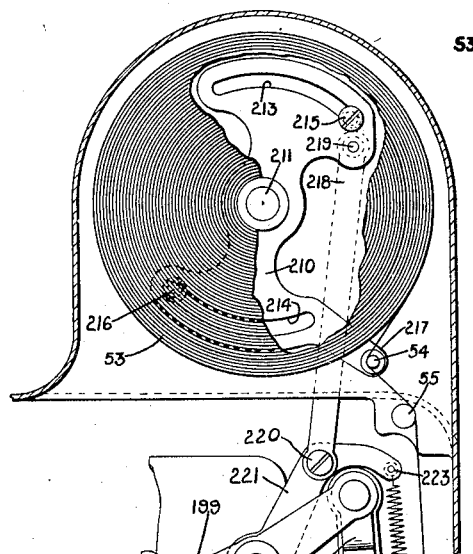
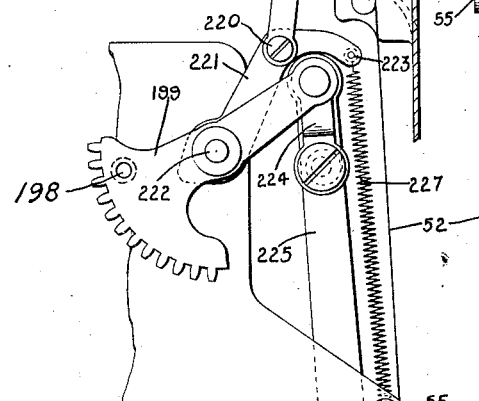
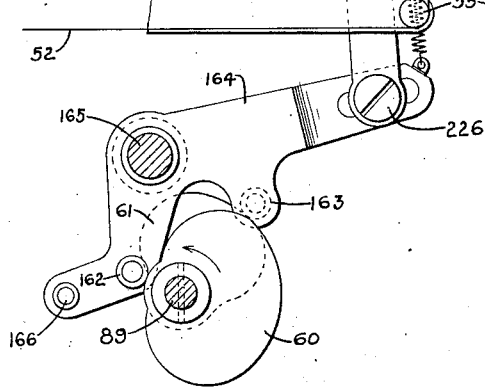
FIG.4
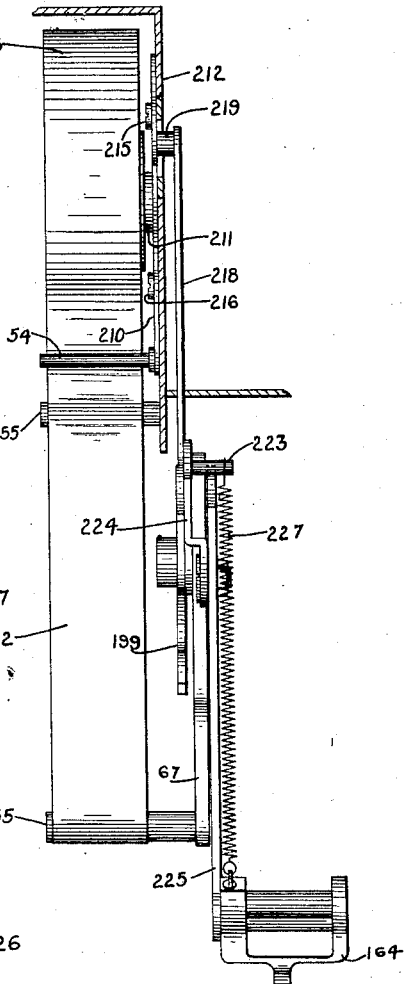
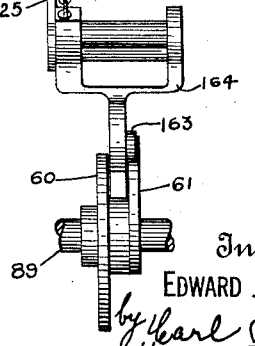
Inventor
EDWARD J. VON PEIN
Attorneys June 3, 1930.  E. J. VON PEIN  1,761,548

CASH REGISTER

Filed April 23, 1920  6 Sheets-Sheet 4

Inventor
EDWARD J. VON PEIN
by *Carl Benst*
*Henry E. Stauffer*
Attorneys

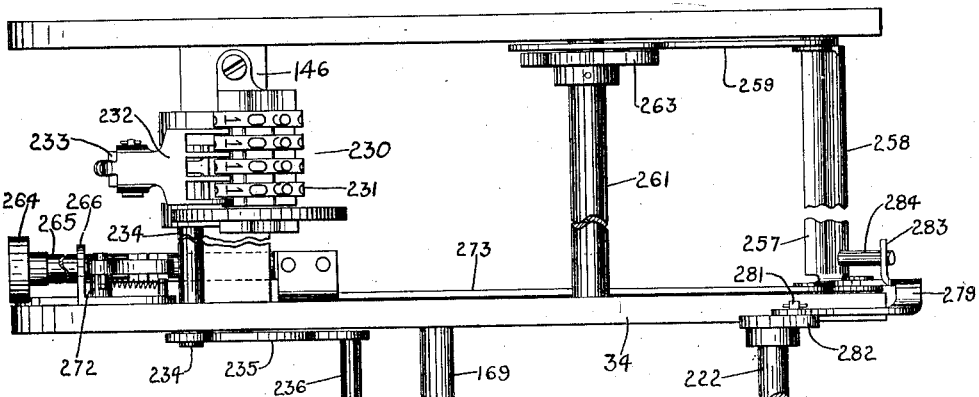

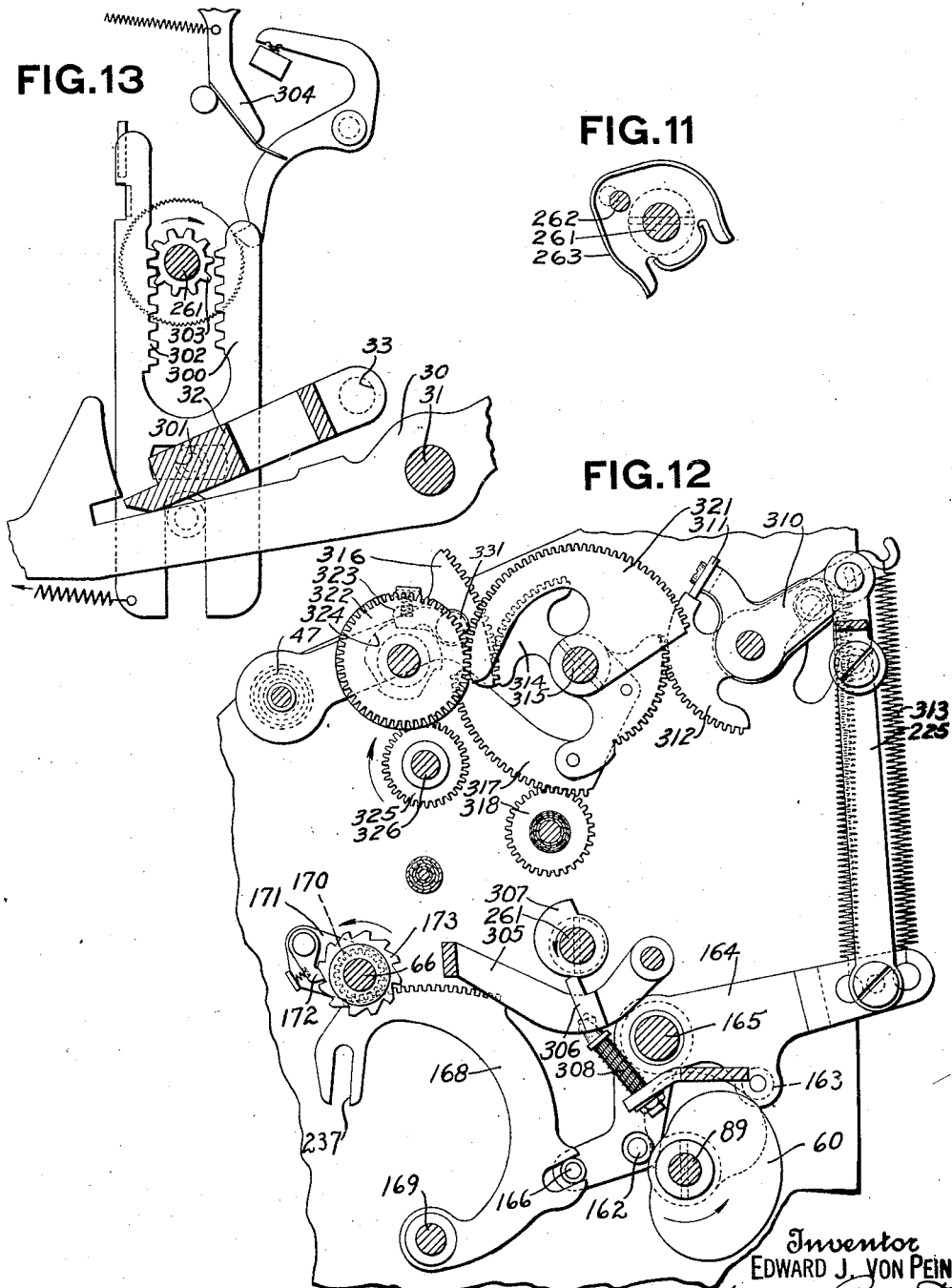

Patented June 3, 1930

1,761,548

UNITED STATES PATENT OFFICE

EDWARD J. VON PEIN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed April 23, 1920. Serial No. 376,088.

This invention relates to improvements in accounting machines, and has more particular relation to those, which in addition to making a record of transactions upon totalizers, make an additional printed record of all transactions, and in particular accumulate totals and print them.

One of the objects of this invention is the provision of means for releasing a cash drawer upon an operation involving the printing of an accumulated total and the restoring to zero of the totalizer upon which such total was accumulated.

Specifically, an object of this invention is the provision of drawer releasing means operated directly from the operating device for the total printing and totalizer restoring to zero mechanism after the total has been printed and the totalizer restored to zero.

Another of the objects of this invention is to provide improvements in the totalizing operating device, whereby the construction is such that the operator can not strain the mechanism by a rapid rotation of the operating handle.

Another object of the invention is to provide a paper slackening device, whereby the retarding tension on the paper is relieved to permit the feed rolls to issue the proper length of slip.

Another object of this invention is to provide improvements in the special counter operating device.

Another object of this invention is to provide improvements in the bell operating device.

Another object of this invention is to provide improvements in the indicator mechanism.

With these and incidental objects in view, the invention consists in certain novel features of construction and combinations of parts, the essential elements of which are set forth in the appended claims, and a preferred form or embodiment of which is hereinafter described with reference to the drawings which accompany and form part of this specification.

Of said drawings:

Fig. 3 is a detail view showing an elevation of the auxiliary paper feed mechanism.

Fig. 4 is a rear elevation of the mechanism shown in Fig. 3.

Fig. 9 is a detail plan view showing the special counter, the bell mechanism and the indicating retaining bail and its cooperating mechanism.

Fig. 10 is a side elevation of part of the mechanism shown in Fig. 9.

Fig. 11 is a detail view of the cam and roller which cooperates therewith for rocking the indicator supporting frame on item entering operations.

Fig. 12 is a cross sectional view taken just inside of the printer frame and shows the mechanism for setting the type in total printing and thereafter restoring the totalizer to zero.

Fig. 13 shows the means for rotating the main driving shaft.

Fig. 14 is a front view of a portion of the mechanism shown in Fig. 12.

The machine disclosed is of the general type shown in Letters Patent to Cleal 718,565, and 773,060, granted January 13, 1903, and October 25, 1904, respectively; and the improvements relate directly to the construction shown in the application of Edward J. Von Pein, Serial No. 293,141, filed April 28, 1919.

Described in general terms, the machine includes a series of manipulative devices, such as keys, which operate mechanism to indicate the items, to print the amounts of the items on a receipt strip or other record material, and also operate totalizers. These keys are arranged upon a shaft and are similarly operated, each key imparting an individual characteristic movement to actuate devices which in turn actuate the elements of totalizers in accordance therewith, and also set up type carriers which may have an impression taken therefrom upon said strip.

The machine, as disclosed in the patents to Cleal and the application of Von Pein, is provided with two totalizers; but as the improvements here involved have no bearing upon the number or characters of totalizers, only one is here disclosed, and that only in a general way.

Since the improvements are specific over the construction shown in Von Pein's application, referred to, only so much of the general construction will be given as is necessary to understand the improvements here involved.

Figure 1:
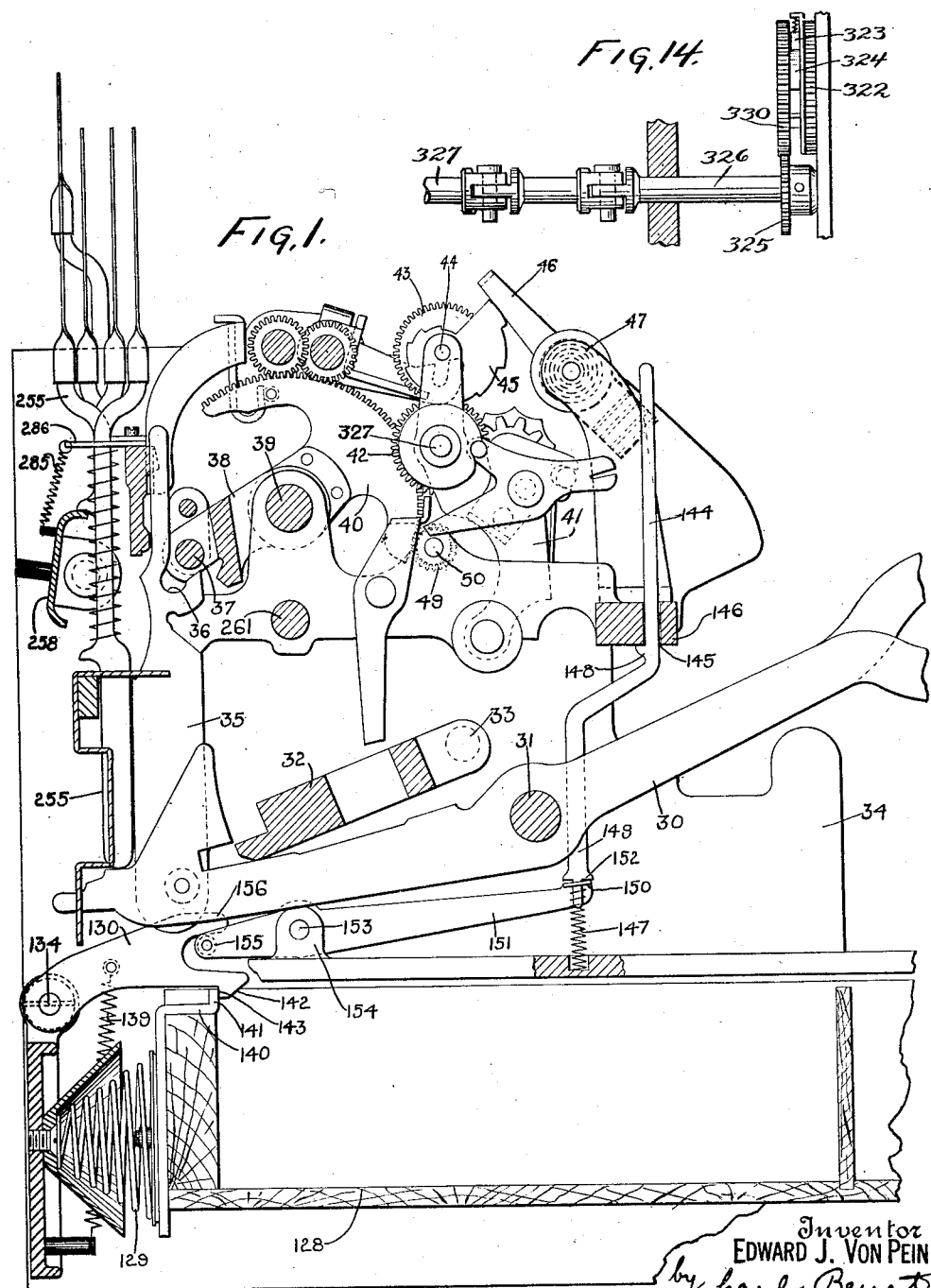
Fig. 1 is a transverse sectional view of the machine.

Keys 30 (Fig. 1) are pivoted upon a transverse shaft 31. When the forward end of one or more of the keys 30 is depressed, a key coupler 32 pivoted on trunnions 33 having bearings in side frames 34 is rocked. Just inside the right hand side frame is a double rack 300 (Fig. 13) guided on a roller carried by the side frame as shown and through a slot in which projects a roller 301 fast on the key coupler 32. When the key coupler 32 is raised the left hand side 302 of the double rack 300 cooperates with a pinion 303 fast on a shaft 261, which is the main driving shaft of the machine. When the key coupler 32 reaches its highest point the double rack 300 is rocked toward the left by a spring pressed pawl 304 and the left hand rack 302 is disengaged from the teeth of the pinion 303. When this occurs the teeth on the right hand side of the double rack are brought into engagement with the pinion 303 and as the key coupler descends to normal position the rotation of the shaft 261 will be completed. A spring attached to the lower end of the double rack then returns the rack to the position shown. The rack is guided in its movement by a flange on the rack and a flange on the frame located as shown. Attached to the rear end of each key 30 is an actuator controller 35, which are formed with graduated slots 36, adapted, when a key 30 is operated, to engage a transverse rod 37, carried by a rocking frame 38, pivoted on a transverse rod 39, to rock said frame different distances, according to the key 30 depressed. There is a frame 38 for each denominational group of keys 30, but only one is here disclosed. Each frame has attached to it a registering segment 40 (Fig. 1).

Figure 2:
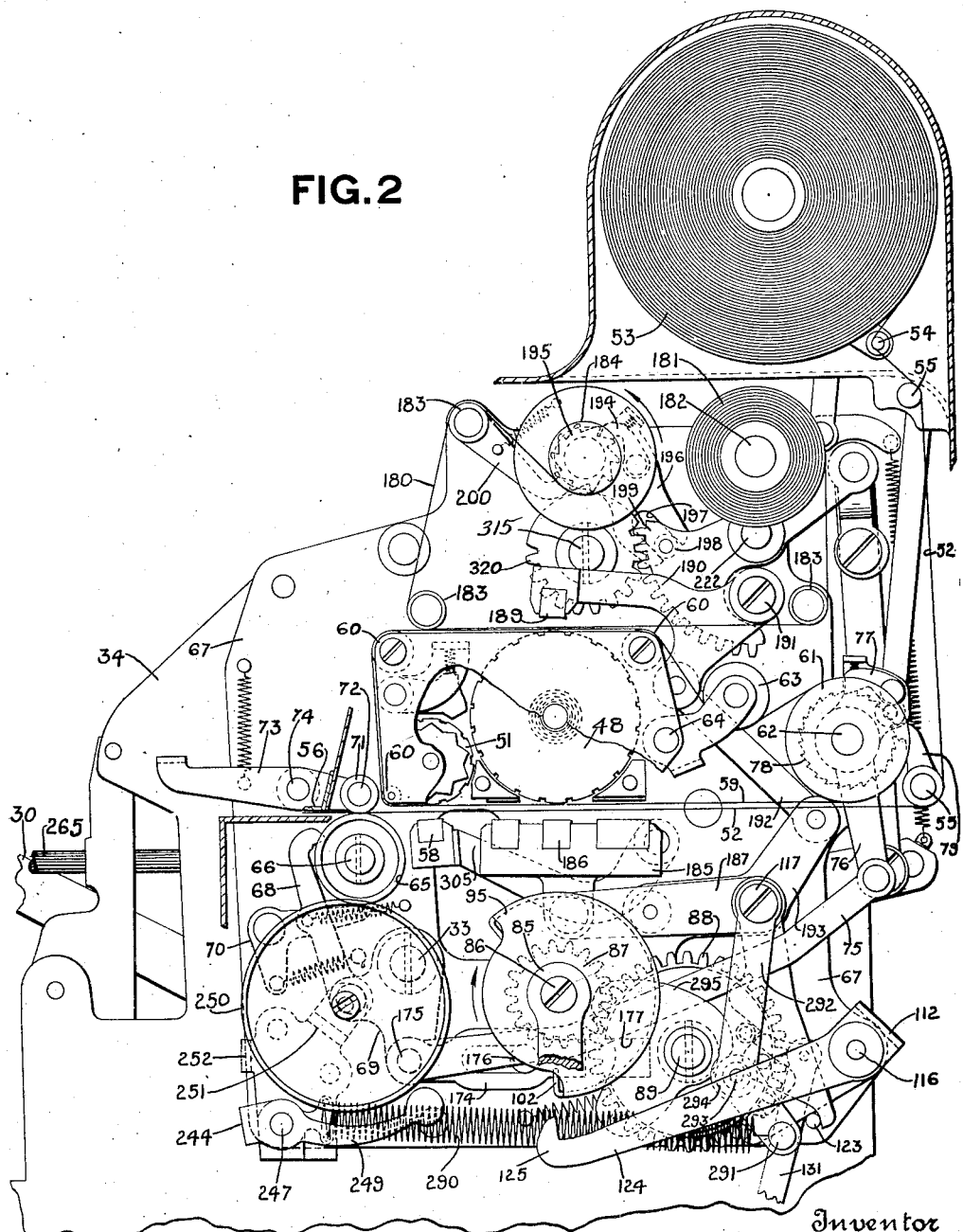
Fig. 2 is a side elevation of the printer.

The totalizers are of the usual form, only one, the recording totalizer being here shown. It is mounted on a pivoted frame 41, and comprises a plurality of rotatable elements, each appropriate to a numerical order, as is usual in these devices. When the totalizer frame is rocked to engage the totalizer with the registering segments 40, the rotatable elements will be caused to rotate and carry with them the gears 42. The gears 42 mesh with gears 43, rotatable on a shaft 44 mounted in brackets carried by the rocking totalizer frame 41. Moving with each gear 43 is a scroll 45. There are as many gears 42, gears 43 and scroll disks 45 for this totalizer as there are denominational elements in the totalizer, all as fully described in the Von Pein application referred to. Any movement of the totalizer elements will be transmitted directly to the stepped disks 45, so that said disks are caused to rotate to positions appropriate to the total of the items entered on the totalizer. Feeler fingers 46, mounted upon telescopic sleeves 47 are brought into contact with the scroll disks varying radial distances from the center thereof to transmit to printing wheels 48 (Fig. 2) the amount accumulated on the totalizer, as fully set forth in detail in the application of Von Pein, referred to.

The left hand totalizer, which is not disclosed in this application, is preferably a reading totalizer of the same general type as the one described, without the added features, the gears 43 and scroll plates 45, shown in connection with the right hand or recording totalizer. No further reference will be made to this totalizer.

Each of the segments 40 (Fig. 1) for the right hand or "recording" totalizer also meshes with a pinion 49. One of these pinions 49 is fast to the left hand end of a shaft 50 while the other pinions are mounted upon the left hand ends of telescopic sleeves 501 which extend to the right (Fig. 10), and on their right hand ends carry printing wheels 51 (Fig. 2) for printing the detail transactions on the receipt strip, as fully set forth in the Von Pein application, referred to.

The receipt strip 52 (Figs. 2, 3 and 4) is run from a supply roll 53, around a rod 54 and guide rolls 55 to a severing plate 56. The strip passes between the type carriers 51 and a platen 58, so that when the platen is operated, an impression will be made on the strip. In order to operate the platen 58 the following mechanism is provided. Integral with the platen carrying arm 305 is a lug 306 the end of which cooperates with a cam 307 fast on shaft 261. This shaft is given a complete rotation at each item entering operation and cam 307, due to its configuration, rocks the platen carrying arm 305 counter clockwise (Fig. 12) against the action of a spring-pressed plunger 308 supported in an extension of the machine frame. As the lug 306 of the platen carrying arm passes the high portion of the cam 307 the spring plunger 308 will rock the platen carrying arm rapidly clockwise and bring the platen 58 into contact with the typewheels with sufficient force to take an impression therefrom on the strip. To secure a visible impression a suitable continuous inking ribbon 59 is wound around guide rolls 60 mounted in the printer frame and over an inking roller 61 mounted upon a stud 62 projecting from the printer plate. This ribbon is held taut by a tension roll 63 supported in a frame mounted upon a rod 64, pivoted in the printer frame. The ribbon is fed at each operation of the recording keys 30.

For the purpose of feeding the receipt strip 52 between the printing of each item thereon, there is provided a feed roller 65 (Fig. 2), fast on a shaft 66 (see also Fig. 12), journalled in the printer side frame 67, and having fast thereto a ratchet wheel, not shown, but which is identical with the ratchet 173 (Figs. 10 and 12), and this ratchet is engaged by a spring controlled pawl 68 pivoted on an arm 69, said arm being fast to one of the trunnions 33 upon which the key coupler oscillates.

At each operation of one of the keys 30, which imparts an oscillatory motion to the key coupler 32, the pawl 68 will cause the feed roller 65 to rotate in counter-clockwise direction. A spring controlled retaining pawl 70 prevents retrograde motion of the roller 65. Directly above the feed roller 65 and in contact with the same is a tension roller 71 freely mounted on a stud 72 carried by a spring controlled manually operable lever 73 pivoted on a stud 74 mounted in the printer side frame 67. As the receipt strip 52 passes between the feed roller 65 and the tension roller 71 it will be fed toward the front of the machine a distance equal to the line spacing of the printing at each operation of a key 30.

The arm 69 which oscillates with the key coupler is connected by a link 75 to the ribbon feeding lever 76, which carries a spring actuated pawl 77 engaging a ratchet wheel 78, attached to the ink roller 61. The pawl 77 conveys a rotary motion to the ink roller 61. A spring controlled pawl 79 prevents retrograde movement of the inking roller 61.

So far the construction is substantially that of the Von Pein application, referred to.

Figure 5:
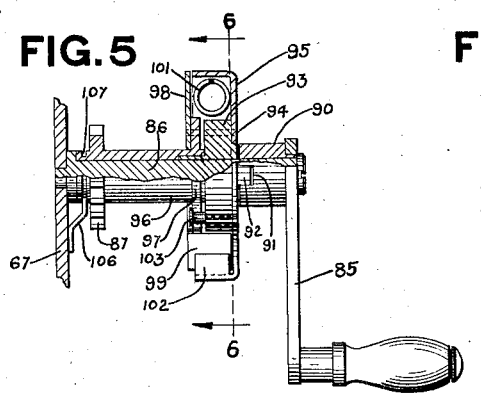
Fig. 5 is a detail view, partly in section, of the totalizing operating handle.
Figure 6:
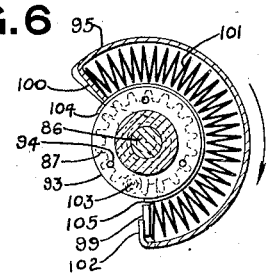
Fig. 6 is a sectional view taken on the line 6—6 of Fig. 5.

The total printing crank 85 (Figs. 2 and 5), which primarily serves as an actuator in connection with the printing and indicating of the total, is freely mounted upon a stud 86 supported in the side frame 67, and is adapted to be given two rotations in clockwise direction at each operation. The crank 85 is connected, by a flexible device hereinafter described, with a gear 87, which meshes with a gear 88 fastened on a driving shaft 89.

The crank 85 proper is fast to a sleeve 90, freely mounted upon the stud 86 projecting laterally from the printer side frame 67. The sleeve 90 has a notch 91 with which a lug 92 engages. This lug 92 projects from a disk 93 pivoted upon the stud 86. Fastened to the disk 93 by rivets 94 is a spring housing 95.

The gear 87 has a sleeve 96 extending to the right and having a flange 97 to which a disk 98 is fastened. On the lower side of the disk 98 is a lip 99 formed at a right angle to the disk. Compressed between the lip 99 on the disk 98 and a lip 100 formed on the housing 95 is a spring 101. This spring 101 normally holds the lip 99 on the disk 98 in contact with a lip 102 on the housing 95, and as the crank 85 is rotated in clockwise direction, the gear 87 will be caused to rotate by the spring 101, one end of which contacts the lip 100 on the housing 95 connected to the crank 85, and the other end the lip 99 formed on the disk 98 which is connected to the gear.

The spring 101 is of sufficient strength to operate the totalizing mechanism upon the rotation of the crank 85, and not permit the mechanism to be strained by a too rapid rotation of said crank. Should the crank 85 be rotated at a faster speed than the mechanism will respond to, the spring 101 will be compressed to a greater extent against the lip 99. To limit the compression of the spring 101, a pin 103 projecting from the disk 93 travels in the opening formed in the disk 97 between shoulders 104 and 105.

The gear 87 is held in position on the stud 86, by a clip 106 which is fast to the printer side frame 67 and extends away from said frame to engage with a groove 107 formed in the hub of the gear 87.

Secured to the gear 88 (Fig. 7) is a disk 109 carrying a roller 110, which engages an arm 111 of a yoke 112. Also fastened to gear 88 is a block 113, having a shoulder 114 which is adapted to engage the end 115 of the yoke 112, pivoted upon a stud 116 mounted in the side frame 67.

Figure 7:
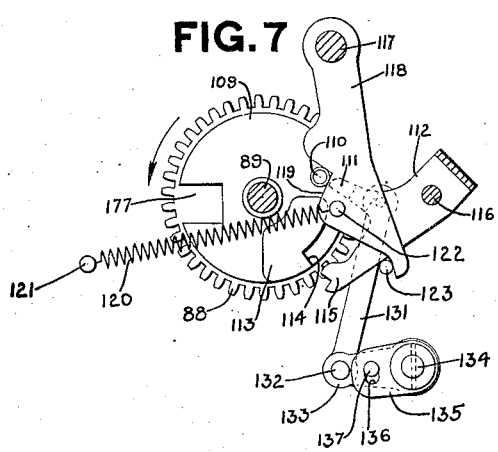
Fig. 7 is a detail view showing an elevation of part of the drawer release mechanism.

Freely mounted on a stud 117 projecting from the side frame 67 is an arm 118 having an angle notch 119 engaging the roller 110. A spring 120, one end of which is fastened to a pin 121 projecting from the side frame 67, the other end being attached to a pin 122 carried in the arm 118, will cause the roller 110 to assume a position in the notch as shown in Fig. 7. This is the home position of the totalizing driving shaft 89. The end 115 of the yoke 112 is normally disengaged from the block 113, so that the crank 85 can be rotated to perform its previously described functions; but toward the end of its movement the roller 110 comes into contact with an arm 111 of the yoke 112 and raises the arm to such a position that the end 115 will be in the path of the shoulder 114 of the block 113, and thus the shaft 89 is stopped at the completion of its cycle. In this position the roller 110 assumes a position in contact with the upper face of the notch 119 and not in contact with the lower face of the notch. As the operator releases the operating crank, the tension of the spring 120 will cause the arm 118 to move slightly in clockwise direction thereby forcing the roller 110 down into the bottom of the notch 119, which action will give a slight rotation to the shaft 89 in clockwise direction, releasing the end 115 from the shoulder 114, and allowing the yoke 112 to swing in counter-clockwise direction until it comes in contact with a pin 123, which projects laterally from the side frame 67. This pin 123 also serves the purpose of holding the arm 118 against the tension of the spring 120 while the roller 110 is out of engagement with the arm 118.

The yoke 112 (Figs. 2 and 7) has an arm 124, extending forward with a hook end 125, which upon the rocking of the yoke 112 by the roller 110 contacting the arm 111, will be raised to a position in the path of the formed lip 102 of the housing 95 which will contact the hook 125, and stop the rotation of the operating crank 85. At the same time the shaft 89 will be stopped by shoulder 114 contacting the end 115 of said yoke 112.

At the time the roller 110 (Fig. 7) rocks the yoke 112, the cash drawer latch 130 (Fig. 1) will be raised, thereby releasing the cash drawer 128 and allowing it to move forwardly on its guides under the action of a spring 129.

Figure 8:
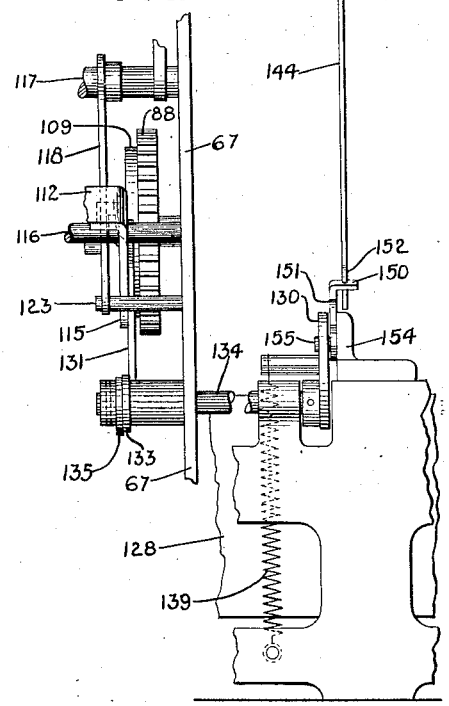
Fig. 8 is a detail view showing a rear elevation of the drawer release mechanism.

For conveying the motion of the yoke 112 to the drawer latch 130 (Figs. 1, 7 and 8), a link 131 is provided, having one end pivoted to the yoke 112, and the other at a point 132 to an arm 133 (Fig. 7) pivoted upon a shaft 134, supported by the frame of the machine. Pinned to the left hand end of the shaft 134 as viewed in Fig. 8 is an arm 135, having an elongated slot 136 engaging with a pin 137 projecting laterally from the arm 133. In the normal position, the pin 137 contacts the upper end of the slot 136, and as the yoke 112 is rocked in clockwise direction the shaft 134 is simultaneously rocked to raise the latch 130, which is pinned to the left hand end of the shaft 134. A spring 139 (Fig. 1) normally holds the upper end of the slot 136 (Fig. 7) in contact with the pin 137 and the yoke 112 in contact with the pin 123.

In closing the cash drawer 128 (Fig. 1) after the operation of the machine, a formed latch plate 140 having an upwardly projecting lug 141 will contact an angle face 142 formed on the end of the latch 130, causing said latch to swing counter-clockwise and allowing the lug 141 to pass under the shoulder 143 whereupon the spring 139 will cause the latch to move clockwise to latch the drawer in its normal closed position, as shown in Fig. 1. The rocking of the latch in the counter-clockwise direction when closing the cash drawer will cause the arm 135 (Fig. 7) to move in clockwise direction without affecting the arm 133, the elongated slot 136 being provided for that purpose.

It is necessary at times to open the cash drawer 128 without operating the totalizing crank 85. This is accomplished by a manipulative device, consisting of an upright rod 144 (Figs. 1 and 8), guided in a slot 145 in a frame cross bar 146. The lower end of this rod 144 engages a compression spring 147 supported in the frame of the machine. A shoulder 148 formed in the rod 144 limits the upward movement of said rod, it being normally in contact with the bar 146. The lower end 149 of the rod 144 is formed so as to enter a hole in an ear 150 formed on a lever 151. Shoulders 152 on the rod 144 rest on the ear 150.

The lever 151 is fulcrumed on a stud 153 mounted in a lug 154 which is a part of the frame of the machine. The rear end of the lever 151 has a projecting pin 155 which contacts the underside of a projection 156 on the latch 130. The operator by giving a downward motion to the rod 144 will cause the latch 130 to swing in counter-clockwise direction causing the shoulder 143 to be disengaged from the lug 141 thereby allowing the cash drawer to move forwardly under the action of the spring 129.

The mechanism for giving additional movement to the feed roll 65 (Fig. 2) when printing totals is the same as that of the Von Pein application referred to, and is briefly as follows: Fast upon the shaft 89 are two cams 60 and 61 (Figs. 3, 4 and 10) which impart an oscillatory motion to a lever 164 by contact with anti-friction rollers 162 and 163, carried on studs mounted in the lever 164, which in turn is pivoted upon a shaft 165. Carried in the lower end of the lever 164 is an anti-friction roller 166, engaging a slot 167 in a segmental arm 168 (Figs. 10 and 12) pivoted upon a stud 169 mounted in the machine frame 34, and meshing with a pinion 170 fast to an arm 171 freely mounted upon the shaft 66. The arm 171 carries a spring controlled pawl 172, engaging a ratchet wheel 173, fast to the shaft 66 to which is attached the receipt strip feeding roller 65, previously described. Counter-clockwise movement of the segmental arm 168 by the lever 164, rocks the arm 171 clockwise and the pawl 172 is moved over the ratchet 173. Upon return movement of the segmental arm 168, the pawl 172 operates the ratchet 173 and consequently the feeding rollers 65.

To prevent simultaneous manipulation of both, the keys and the totalizer crank, a device is provided which will lock either operative element while the other is being manipulated. This also is the same in substance as the mechanism for accomplishing the same purpose shown in the application of Von Pein referred to. A sliding bar 174 (Fig. 2) is pivoted upon a stud 175 mounted in the arm 69, which is operated by the key coupler, as previously described. The bar 174 is slotted to slide on a guide stud 176 mounted in the printer side frame 67. The end of the said bar 174 is so shaped as to enter a slot 177 in the disk 109 fastened to the gear 88.

With every operation of the keys 30 to enter an amount, the bar 174, through the action of key coupler 32 and lever 69, is thrust into the slot 177 of the disk 109, thus preventing movement of the crank 85 while the machine is being used to enter amounts. On the other hand, when the crank 85 is being operated to take a total, it at once becomes impossible to depress the keys, for the bar 174 will strike the periphery of the disk 109, and prevent depression of the keys.

The printing mechanism in general is that described in detail in said application of Edward J. Von Pein, and forms no part of this invention. It will be but briefly described here.

The total printing wheels 48 (Fig. 2), which are positioned by the feeler fingers 46 (Fig. 1) contacting the stepped scroll disks 45 during the rotation of the totalizing crank 85, are twice the diameter of the item printing wheels 57, and contain two sets of type characters, one set for printing upon the receipt strip and the other for printing upon the total record strip 180. The total record strip 180, which contains a total of the records accumulated in the totalizer, is fed from the supply roll 181, freely mounted upon a stud 182, projecting from the printer side frame 67, around guide rollers 183 and onto a receiving roll 184. The receiving roll 184 is rotated in counter-clockwise direction by a spring controlled pawl 194, engaging a ratchet wheel 195, fast to the receiving roll. The spring controlled pawl 194 is mounted upon an arm 196, having a slot 197 engaging a roller 198 (see also Fig. 3), carried by a segment 199 fast on a shaft 222, which will hereinafter be described. A spring controlled pawl 200 engages the ratchet wheel 195 to prevent retrograde movement of the receiving roll 184.

The upper end of a link 225 (Fig. 12), is connected to an arm 310 of a yoke 311 extending across a series of segments 312 constantly urged in clockwise direction by springs 313 attached thereto and to the lever 164. The segments 312 mesh with double segments 314 loose on the shaft 315 which in turn mesh with segments 316 attached to sleeves 47 to which the feeler fingers 46 cooperating with the stepped scroll disks 45 are secured. The double segments 314 each carry a third segment 317 which cooperates with a gear 318 carried by one of the sleeves to which the total type wheels 48 are secured. It is obvious that the amount of movement that the springs 313 may transmit to the type wheels 48 is determined by the amount of movement of the scroll disks 45 from zero position.

The segment 199 hereinbefore mentioned meshes with a partial gear 320 (Fig. 2) secured to the shaft 315, which, through a segment 321, oscillates a gear 322 (Figs. 12 and 14) to which is rigidly secured a disk 331 carrying a spring-pressed pawl 323 cooperating with a ratchet 324. This ratchet is carried by a gear 330 which cooperates with a gear 325 on a shaft 326 operatively connected to the totalizer turn-to-zero shaft 327 by means of a short shaft and two universal joints (Fig. 14). It is apparent, therefore, that motion will be transmitted to the totalizer turn-to-zero shaft to restore the totalizer to zero during each total printing operation shortly after the total impression has been taken.

This mechanism is fully shown and described in the co-pending application of E. J. Von Pein, No. 293,141, filed April 28, 1919, and reference may be made thereto if a more detailed description is desired.

At the proper time, and by the operation of the totalizing crank, a platen carrying block 185 will be raised, and a platen 186 will press the receipt strip 52 against the type wheels 48 to print the total.

The platen block 185 (Fig. 2) is pivotally mounted upon an arm 187, pivoted upon the stud 117, which projects from the printer side frame 67.

Simultaneously with the making of an impression upon the receipt strip, a platen 189 moves the total record strip 180 against the top of the total printing wheels 48 to cause an impression of the total to be made upon said strip 180. The platen is carried in an arm 190, pivoted on a stud 191, and connected by a link 192 to a lever 193, pinned to the arm 187 and pivotally mounted on the stud 117.

In order to ease the work of the feed rolls 65 and 71, means is here provided to produce slack in the receipt strip during total printing, previous to the feeding of said strip during a totalizing operation. This is accomplished by a double segmental arm 210 (Fig. 3), pivoted upon a stud 211, projecting laterally from the supply roll housing 212. The arm 210 has two concentric slots 213 and 214 into which are fitted guide screws 215 and 216, respectively, which limit the swinging motion of said arm 210. An arm 217 extending from the arm 210 carries a pin 54, around which the strip 52 passes as it leaves the supply roll 53. It will be seen from Fig. 3 that clockwise motion of the arm 210 will cause the strip 52 to unwind from the supply roll 53.

The arm 210 receives its motion from the lever 164. A link 218 is pivoted at one end on a stud 219 secured in the arm 210, and at its other end on a stud 220 secured in the arm 221, which, in turn, is pivoted on the shaft 222. The previously mentioned link 225 connected at its lower end to a stud 226 on the lever 164, and at its upper end to the segment 199 through the adjustable coupling link 224, communicates motion from the lever 164 to the segment 199. The arm 221 has an extension which reaches over and above the link 224 attached to the link 225. A tension spring 227 is secured at one end to this extension and at the other to the lever 164. This spring tends to keep the arm 221 in contact with the link 224. As the rear end of the lever 164 moves up and down under the action of its cams it communicates movement through link 225 to segment 199, and through arm 221 and link 218 to the arm 210. Movement of arm 210 is limited by the screws 215 and 216, whereas movement of the segment 199 is determined by the movement of the lever 164. By reason of the spring connection between the lever 164 and the arm 221, the arm 221 is not forced to make the complete movement of the segment 199. Thus, while the arm 210 derives its motion from the lever 164, the extent of its movement is determined by the length of the slots 213 and 214, any excess of movement of the segment 199 over that necessary to give this movement to the arm 210 being taken up by the spring 227.

Each totalizing operation of the machine is recorded upon the counter 230 (Figs. 9 and 10). This is a step-by-step counter and includes a plurality of number wheels 231 operated by a multiple-tined pawl 232 pivotally mounted on the upper end of an arm 233 fast on a shaft 234 mounted in the framework of the machine. It is operated by means novel in this application. Fast to the right end of the shaft 234 outside of the machine frame 34 (Figs. 9 and 10) is an arm 235, which has projecting from its lower end a pin 236, which enters a slot 237, formed in the segmental arm 168, previously described. At each operation of the totalizing crank, the shaft 234 (Figs. 9 and 10) will be rocked first in clockwise direction and then in counter-clockwise direction, thereby operating the tined pawl 232 and rotating the proper number wheel or wheels 231 one step.

The pin 236 (Figs. 9 and 10) also serves the purpose of ringing the bell at the time the totalizing crank is operated. This arrangement also is novel in this application. As arm 235 is rocked said pin 236 travels forwardly and engages a bell crank lever 240, which swings the same on its pivot 241 against the tension of a spring 242, one end of which is attached to the lever 240 and the other to a pin 243, projecting from a yoke 244. The spring 242 normally holds the lever 240 in contact with a pin 245. As the pin 236 travels forwardly it will leave the lever 240, and as it does this, the lever 240 will again assume its normal position under the influence of the spring 242. On the return of the pin 236 to its normal position, it will contact the forward face 246 of the lever 240, and rock the lever 240 clockwise. This movement will continue until the yoked member 244 is rocked clockwise (Fig. 10) far enough to permit the face 246 of lever 240 to become disengaged from pin 236. As the pin 236 continues its movement it finally passes off the face 246 and the yoke 244 is immediately rocked counter-clockwise under the action of a spring 248 (Fig. 9), one end of which is attached to the yoke 244 and the other end fast to the rod 247.

The right hand side of the yoke 244 (Figs. 2 and 9) is in the form of a bell hammer 249, which normally does not contact the bell 250; but as the yoke 244 returns to its normal position under the action of the spring 248, the stopping of same will give a slight oscillation to the bell hammer 249, causing it to contact the bell 250 and ring the same. The bell 250 is fast to a supporting bracket 251, which projects from the printer side frame 67. On the bracket is a formed ear which retains the yoke 244 in its normal position.

The indicating mechanism contains novel features, and will now be described. Resting upon the rear ends of the item keys 30 are indicators 255 (Figs. 1 and 10), which, as the forward ends of the keys 30 are depressed, will be elevated to display the figures on the top part of the indicators. A lug 256 which projects toward the rear from each indicator 255 will rise to a position above a flange 257, formed on a rocking bail 258, pivoted at each end in the side frames of the machine. The rocking of said bail 258 is so timed that the flange 257 will be out of the path of the projections 256 as the indicators are rising to elevated positions, after which the bail 258 is rocked back to its normal position, bringing the flange 257 under the projections 256, thereby retaining in raised positions the indicators 255 that have been raised by the depression of the keys 30. The bail 258 is rocked first in clockwise direction and then in counter-clockwise direction (Fig. 10) by a pitman 259, one end of which is pivoted to the bail 258 and the other end having an elongated opening 260, which straddles the rotating shaft 261. Mounted on the pitman 259 is a roller 262, which co-operates with a formed cam 263 (Fig. 11) fast on the shaft 261 and which rotates in clockwise direction (Fig. 11) or counter-clockwise (Fig. 10) each time the keys 30 are operated. The indicators 255, which have been left in the elevated positions by the operation of the keys 30, will drop to their normal positions at the next operation of the keys, and the indicators raised during said next operation will remain in elevated position until the keys 30 are again operated, all of which is well known in the art.

In the totalizing operation, it is desirable to drop the indicators 255 which have been elevated at the last operation of the keys 30, when two or more items have been entered in the totalizer. In the case where only one item has been entered, it is desirable that the indicators remain elevated, during the totalizing operation. To accomplish these results, a manipulative device, located near the right hand side of the machine is placed in the "in" position to allow the indicators 255 to remain elevated during the totalizing operation and in the "out" position to drop said indicators 255 when totalizing.

This manipulative device consists of a push key 264 (Figs. 9 and 10), mounted upon the end of a horizontal rod 265, supported by a bracket 266 and a lug 267 projecting downwardly from the cross bar 146 extending between the two side frames of the machine. This rod 265 has two notches 269 and 270, with either of which a spring controlled pawl 271 may engage. The pawl 271 is freely mounted upon a stud 272, which projects from the bracket 266. Fast to the rear end of the rod 265 is a bar 273 extending to the rear of the machine and having a slot 274 engaging a stud 275, mounted in the side frame 34 of the machine. This bar 273 at its rear end has an upwardly extending projection 276, carrying a stud 277, which engages a slot 278 in a vertical rod 279, the upper end of which has an elongated opening 280 engaging a pin 281 mounted in an arm 282, which is fast on the shaft 222.

The turning of the totalizing crank 85 (Figs. 2 and 5) will rock the shaft 222 (Figs. 9 and 10) first clockwise and then counterclockwise, thereby causing the bar 279 to move downwardly and then return. An ear 283 is formed on the bar 279 and will contact a pin 284 and cause the bail 258 to rock in clockwise direction, thereby removing the flange 257 from the projections 256 on the elevated indicators 255, and allowing said indicators to drop to their normal positions when the totalizing crank is operated to print a total of two or more items accumulated on the totalizer.

When printing a total after only one item has been entered by the keys 30, the manipulative key 264 is pressed inwardly a distance sufficient for the pawl 271 to engage the notch 269. This will displace the bar 279 laterally so that as it is moved down during the initial stage of the total taking operation the lug 283 will pass by the pin 284, and therefore not disturb the bail 258. The indicators that have been raised by the last transaction, therefore, will remain elevated.

A spring 285, one end of which is attached to the bail 258, and the other to a bar 286, will normally hold the bail 258 in the position shown in the drawings. There is a spring 285 at each end of the bail 258.

To equalize the work of the totalizing crank 85 and give a nearly uniform rotation to the totalizing shaft 89 a spring 290 (Fig. 2) is employed. This has its forward end attached to the bell bracket 251, and its rear end is attached to a pin 291 projecting laterally from an arm 292, pivoted on the stud 117.

Freely mounted upon a stud 293, carried by the arm 292, is a roller 294, which co-operates with a cam 295, fast on the shaft 89. As the shaft 89 rotates during the totalizing operation, the roller 294 will follow the form of this cam 295, causing the spring 290 to expand and contract as the shaft 89 rotates.

While the form of mechanism herein shown and described, is admirably adapted to fulfil the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a totalizer adapted to be restored to zero, means for restoring the totalizer to zero, a money receptacle, a latch to hold the receptacle normally inaccessible, and connections between the restoring means and the latch operable only upon an operation of said restoring means for rendering the money receptacle accessible.

2. In a machine of the class described, the combination of a totalizer adapted to be restored to zero, means for entering data thereon, means for restoring the totalizer to zero and for recording the data thereon, a money receptacle, a latch to hold the receptacle normally inaccessible, and connections between the restoring means and the latch operable only upon an operation of said restoring and recording means for rendering the money receptacle accessible.

3. In a machine of the class described, the combination of a totalizer adapted to be restored to zero by an operation of said machine, a normally inaccessible money receptacle, means for restoring the totalizer to zero, a stop actuated upon operation of said restoring means for stopping the movement thereof when the totalizer has been restored to zero, and means operated by the stop for rendering the money receptacle accessible.

4. In a machine of the class described, the combination of a totalizer adapted to be restored to zero by an operation of said machine, a money receptacle, a latch for rendering the receptacle normally inaccessible, means for restoring the totalizer to zero, a stop actuated upon operation of said restoring means for stopping the movement thereof when the totalizer reaches zero, and connections intermediate said latch and said stop for rendering the money receptacle accessible upon operation of said stop.

5. In a machine of the class described, the combination of a totalizer adapted to be restored to zero by an operation of said machine, a money receptacle, a pivoted latch for rendering the receptacle normally inaccessible, means for restoring the totalizer to zero, a pivoted member adapted to be operated to stop the restoring means when the totalizer reaches zero, and means for transmitting movement of the pivoted member to the pivoted latch to render the receptacle accessible.

6. In a machine of the class described, the combination of a totalizer adapted to be restored to zero; means for entering data thereon; a money receptacle; means for restoring the totalizer to zero and for recording the data thereon; a lock to hold the receptacle normally locked; and connections between the restoring means and the lock operable only upon operation of said restoring and recording means, and operating after the record has been made for releasing the money receptacle.

In testimony whereof I affix my signature.

EDWARD J. VON PEIN.